US012064986B2

(12) United States Patent
Trassl et al.

(10) Patent No.: US 12,064,986 B2
(45) Date of Patent: *Aug. 20, 2024

(54) SECURITY ELEMENT WITH AN OPTICAL EFFECT LAYER

(71) Applicant: Hueck Folien Gesellschaft m.b.H., Baumgartenberg (AT)

(72) Inventors: Stephan Trassl, Baumgartenberg (AT); Martin Egginger, Linz (AT); Marco Mayrhofer, Baumgartenberg (AT); Anita Fuchsbauer, Linz (AT)

(73) Assignee: Hueck Folien Gesellschaft m.b.h., Baumgartenberg (AT)

( * ) Notice: Subject to any disclaimer, the term of this patent is extended or adjusted under 35 U.S.C. 154(b) by 0 days.

This patent is subject to a terminal disclaimer.

(21) Appl. No.: 17/754,477

(22) PCT Filed: Sep. 17, 2020

(86) PCT No.: PCT/EP2020/076008

§ 371 (c)(1),
(2) Date: Apr. 1, 2022

(87) PCT Pub. No.: WO2021/063693

PCT Pub. Date: Apr. 8, 2021

(65) Prior Publication Data

US 2024/0042785 A1 Feb. 8, 2024

(30) Foreign Application Priority Data

Oct. 3, 2019 (EP) .................................... 19201226

(51) Int. Cl.

| | |
|---|---|
| ***B42D 25/21*** | (2014.01) |
| ***B42D 25/324*** | (2014.01) |
| ***B42D 25/328*** | (2014.01) |
| ***B42D 25/364*** | (2014.01) |

(52) U.S. Cl.

CPC ........... *B42D 25/21* (2014.10); *B42D 25/324* (2014.10); *B42D 25/328* (2014.10); *B42D 25/364* (2014.10)

(58) Field of Classification Search

CPC ..... B42D 25/21; B42D 25/328; B42D 25/324
USPC ........ 283/72, 74, 75, 77, 82, 83, 85, 94, 98, 283/901
See application file for complete search history.

(56) References Cited

U.S. PATENT DOCUMENTS

| | | | | |
|---|---|---|---|---|
| 7,405,879 | B2 | 7/2008 | Wild et al. | |
| 8,400,495 | B2 | 3/2013 | Kaule | |
| 8,449,969 | B2 | 5/2013 | Keller et al. | |
| 10,189,294 | B2 | 1/2019 | Raymond et al. | |
| 10,252,562 | B2 | 4/2019 | Holmes | |
| 10,882,351 | B2 | 1/2021 | Walter et al. | |
| 2005/0151368 | A1 | 7/2005 | Heim | |
| 2005/0175815 | A1 | 8/2005 | Wild et al. | |
| 2011/0012337 | A1 | 1/2011 | Heim | |
| 2015/0314629 | A1 | 11/2015 | Ritter et al. | |
| 2015/0352881 | A1 | 12/2015 | Seils et al. | |
| 2016/0339733 | A1 * | 11/2016 | Holmes ................ | B42D 25/369 |

FOREIGN PATENT DOCUMENTS

| | | | |
|---|---|---|---|
| EP | 2632739 | A1 | 9/2013 |
| EP | 2782765 | B1 | 12/2015 |
| EP | 2885135 | B1 | 1/2018 |
| EP | 3362827 | A1 | 8/2018 |
| EP | 3632698 | A1 | 4/2020 |
| JP | 2005525946 | A | 9/2005 |
| JP | 2005533290 | A | 11/2005 |
| JP | 2010122391 | A | 6/2010 |
| JP | 2017505926 | A | 2/2017 |
| JP | 2018509313 | A | 4/2018 |
| JP | 2019038141 | A | 3/2019 |
| RU | 2316428 | C2 | 6/2005 |
| RU | 2466030 | C2 | 7/2011 |
| WO | 0103945 | A1 | 1/2001 |
| WO | 03070482 | A1 | 8/2003 |
| WO | 2007107235 | A1 | 9/2007 |
| WO | 2012048847 | A1 | 4/2012 |
| WO | 2013079542 | A2 | 6/2013 |
| WO | 2014124781 | A1 | 8/2014 |
| WO | 2015085505 | A1 | 6/2015 |
| WO | 2015107347 | A1 | 7/2015 |
| WO | 2016096086 | A1 | 6/2016 |
| WO | 2018216810 | A1 | 11/2018 |

* cited by examiner

*Primary Examiner* — Justin V Lewis
(74) *Attorney, Agent, or Firm* — Stoel Rives LLP

(57) ABSTRACT

A security element with increased protection against forgery includes at least one first region with structures that reflect an image motif in different spatial regions, such that a moving image is produced for an observer when a light source is moved correspondingly and/or when the viewing angle is changed. When the light source is moved and/or the viewing angle is changed, a movement of the image motif occurs at the same time. Furthermore, an optical effect layer is provided which defines a second region. The structures are covered by the optical effect layer over their entire surface or partially.

20 Claims, 3 Drawing Sheets

SECURITY ELEMENT WITH AN OPTICAL EFFECT LAYER

RELATED APPLICATIONS

This application is a national stage under 35 U.S.C. § 371 of International Application No. PCT/EP2020/076008, filed Sep. 17, 2020, which claims priority of European Patent Application No. 19201226.8, filed Oct. 3, 2019.

TECHNICAL FIELD

The present disclosure relates to a security element, in particular for papers of value, security paper or security objects, such as banknotes, identification cards, credit cards, debit cards, and tickets.

BACKGROUND

Security elements of the initially mentioned type are usually used to increase protection against forgery of papers of value or security papers, such as banknotes, identification cards, credit cards, debit cards, tickets.

It is the object of the present invention to create a security element with an increased protection against forgery.

This object is achieved by a security element of the initially mentioned type according to the present disclosure in that the security element has at least one first region with structures, and the structures reflect an image motif in different spatial regions, such that a moving image is produced for an observer when a light source is moved correspondingly and/or when a viewing angle is changed, wherein, when a light source is moved and/or the viewing angle is changed, a movement of the image motif occurs at the same time, and in this regard it is further provided that an optical effect layer is provided, said optical effect layer defining a second region, and that the structures are covered by the optical effect layer over their entire surface or partially.

The advantage achieved thereby consists in that by a position, overlapping one another, of the first region for forming the image motif formed as a moving image and the second region for forming at least one optical appearance or one optical effect, a high combination and design variety is created. Hence, the protection against forgery of the thus formed security element is even further increased. Thus, the moving image formed by the structures is combined directly with the optical effect generated or caused by the optical effect layer to a total image. An observer of the security element can thus quickly and securely determine the authenticity by pure visual inspection without using any aids.

Moreover, it can be advantageous if the optical effect layer contains color-shifting pigments, in particular interference pigments, pigments with a color-shifting thin-layer-structure or liquid crystal pigments.

Another embodiment is characterized in that the color-shifting pigments comprise at least one absorber layer, at least one spacer layer made of a dielectric material and at least one reflection layer, wherein the spacer layer is arranged between the reflection layer and the absorber layer.

Furthermore, the optical effect layer may comprise at least one liquid crystal layer, in particular a cholesteric liquid crystal layer.

The optical effect layer preferably comprises at least one layer enhancing the color effect on a side facing away from a viewing side. By the layer enhancing the color effect, for example, an enhancement of the color-shifting effect during use of color-shifting pigments or a liquid crystal layer can be achieved. In this regard, from the viewing direction of the user, the layer enhancing the color effect is located behind the color-shifting pigments or the liquid crystal layer.

A further possible embodiment has the features that when the light source is moved and/or when the viewing angle is changed, a color-shifting effect occurs in the optical effect layer.

In a further embodiment, it is provided that the optical effect layer contains metallic pigments and/or magnetic pigments and/or color pigments and/or colorants.

A further embodiment is characterized in that the security element contains a layer with fluorescent pigments and/or fluorescent substances additionally to the optical effect layer.

A further possible embodiment is characterized in that the security element comprises an optically non-linear layer or an optically non-linear ply additionally to the optical effect layer.

A further preferred embodiment is characterized in that the optical effect layer is printed and/or vapor-deposited on the structures.

Furthermore, it can be advantageous if the security element comprises a carrier layer of a plastic material, wherein, in particular, the plastic material is formed of a translucent and/or thermoplastic material, and that the carrier layer preferably comprises at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylchloride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or mixtures and/or copolymers of these materials or is made of at least one of these materials.

Another alternative embodiment is characterized in that the carrier layer has a thickness with a thickness value from a thickness value range the lower limit of which is 5 μm, preferably 10 m, and the upper limit of which is 1000 μm, preferably 50 μm.

A further possible and optionally alternative embodiment has the features that the at least one absorber layer comprises at least one metallic material, in particular selected from the group of nickel, titanium, vanadium, chromium, cobalt, palladium, iron, tungsten, molybdenum, niobium, aluminum, silver, copper and/or alloys of these materials or is made of at least one of these materials.

In a further embodiment, it is provided that the at least one spacer layer comprises at least one low refractive index dielectric material having a refractive index of less than or equal to 1.65, in particular selected from the group of aluminum oxide ($Al_2O_3$), metal fluorides, for example magnesium fluoride ($MgF_2$), aluminum fluoride ($AlF_3$), silicon oxide ($SIO_x$), silicon dioxide ($SiO_2$), cerium fluoride ($CeF_3$), sodium aluminum fluorides (e.g. $Na_3AlF_6$ or $Na_5Al_3F_{14}$), neodymium fluoride ($NdF_3$), lanthanum fluoride ($LaF_3$), samarium fluoride ($SmF_3$) barium fluoride ($BaF_2$), calcium fluoride ($CaF_2$), lithium fluoride (LiF), low refractive index organic monomers and/or low refractive index organic polymers, or at least one high refractive index dielectric material having a refractive index of greater than 1.65, in particular selected from the group of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron (II,III) oxide ($Fe_3O_4$) and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers and/or high refractive index organic polymers, or is made of at least one of these materials.

Another embodiment is characterized in that the at least one reflection layer comprises at least one metallic material, in particular selected from the group of silver, copper, aluminum, gold, platinum, niobium, tin, or of nickel, titanium, vanadium, chromium, cobalt and palladium, or alloys of these materials, in particular cobalt-nickel alloys, or at least one high refractive index dielectric material having a refractive index of larger than 1.65, in particular selected from the group of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron (II,III) oxide ($Fe_3O_4$) and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers and/or high refractive index organic polymers, or is made of at least one of these materials.

A further preferred embodiment is characterized in that the structures are formed as diffractive structures, as micromirrors, as facets with a radiation-optical effect, or as achromatic, reflective structures.

Furthermore, it can be advantageous if the structures are inserted into the carrier layer by means of an impression device, in particular by an embossing process.

Another embodiment is characterized in that the structures are formed in a layer, in particular an embossing lacquer layer, applied onto the carrier layer directly or with the interposition of an intermediate layer, in particular are impressed by means of an impression device.

A further possible embodiment has the features that the further layer with the structures formed therein has a layer thickness with a layer thickness value from a layer thickness value range the lower limit of which is 0.5 μm, in particular 0.8 μm, preferably 1 μm, and the upper limit of which is 300 μm, in particular 50 μm, preferably 20 μm.

According to an advancement, it is possible that the security element is equipped with machine-readable features, wherein the machine-readable features in particular are magnetic coding, electrically conductive layers, materials absorbing and/or remitting electromagnetic waves.

Furthermore, it can be useful if the security element comprises additional layers, said additional layers comprising in particular color lacquers, protective lacquers, adhesives, heat-sealing lacquers, primers and/or films.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF EXEMPLARY EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, are to be analogously transferred to the new position.

The term "in particular" shall henceforth be understood to mean that it may refer to a possible more specific formation or more detailed specification of an object or a process step, but need not necessarily depict a mandatory, preferred embodiment of same or a mandatory practice.

The figure descriptions are intertwined, and equal components or equal parts are provided with equal reference numbers. Furthermore, the term "layer" is generally used for a multi-layered, cohesive composite component. Thus, each of the layers described below may also comprise multiple layers that are preferably interconnected or adhere to one another.

Figure 1:
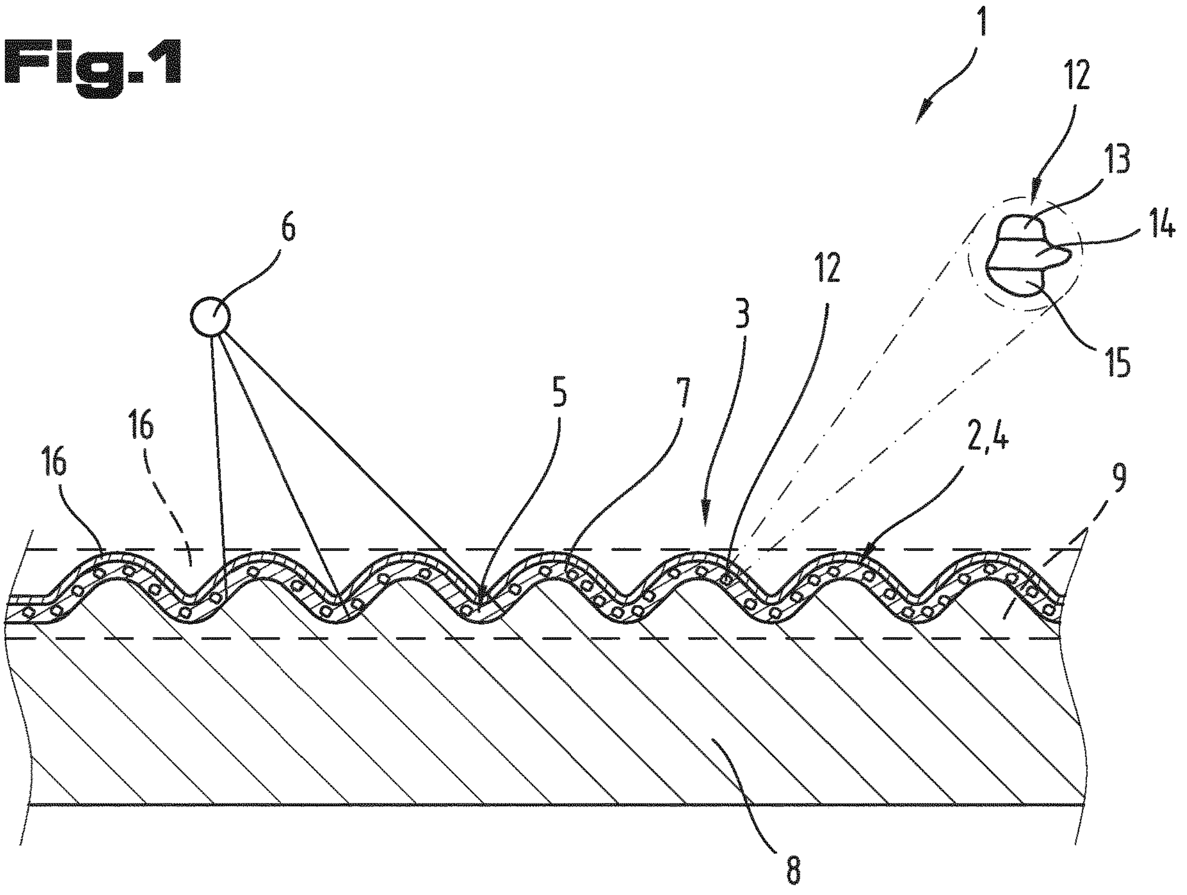
FIG. 1 a section through a possible exemplary embodiment of the security element.

FIG. 1 shows a security element 1, in particular for papers of value, banknotes, card applications or security papers, in a highly stylized representation and not depicted to scale.

The security element 1 comprises at least one first region 2 and at least one second region 3 covering it at least in some sections. The at least one first region 2 is arranged below the second region 3 in the shown position and/or placement of the security element 1. The two regions 2, 3 and/or the layers or plies are formed differently from one another and will be described in further detail below.

The at least one first region 2 comprises structures 4 or is formed by these. By the structures 4 of the first region 2, an image motif 5 is reflected in different spatial regions, such that a so-called moving image is produced for an observer when a light source 6 is moved correspondingly and/or when a viewing angle is changed.

In this exemplary embodiment, the second region 3, which at least sectionally overlaps or superimposes the first region 2, is formed by an optical effect layer 7. The optical effect layer 7 may also be formed as an optically variable layer or be referred to as such. The layer and/or ply forming or carrying the structures 4 is, in turn, covered by the effect layer 7 over its entire surface or partially. Below, the term "covered" is to mean an arrangement in which at least one surface section of at least one of the surfaces of the layer and/or ply forming or carrying the structures 4 is covered by the effect layer 7. Below, some possible exemplary embodiments for the arrangement of the layers and plies are shown and described.

The optical effect layer 7 may have or form an optically variable effect dependent on the viewing angle and/or on the lighting angle and/or on the type of lighting. The optically variable effect may be e.g. a view/see-through effect and/or a color-shifting effect and/or a fluorescence effect or the like.

In this context, it should be noted that the structures 4 may be provided partially or over the entire surface. This also applies to the optical effect layer 7, which may also be provided partially or over the entire surface. The optical effect layer 7 may also be formed of or comprise multiple layers.

The security element 1 may also comprise a carrier layer 8. The carrier layer 8 may be formed of a plastic material. Moreover, it is also possible that multiple layers form the carrier layer 8.

The plastic may be formed of a translucent and/or thermoplastic material. The material for the carrier layer 8, can comprise at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), Polyethylene naphthalate (PEN), Liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylcholride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or mixtures and/or copolymers of these materials or can be made of at least one of these materials.

The carrier layer 8 can, in turn, have a thickness with a thickness value from a thickness value range the lower limit of which is 5 μm, preferably 10 μm, and the upper limit of which is 1000 μm, preferably 50 μm.

The structures 4 described above can be formed, for example, as diffractive structures, as micromirrors, as facets with a radiation-optical effect, or as achromatic, reflective structures. The formation of the structures 4 as a diffractive structures has become known, for example from EP2782765B1, EP2885135B1 and WO2015107347A1. An embodiment of the structures 4 as micromirrors is known to the person skilled in the art e.g. from U.S. Ser. No. 10/189,294A1 as well as EP3362827A1. A facet-like formation of the structures 4 results, for example from EP2632739A1. Moreover, the structures 4 can have been or be inserted into the carrier layer 8 by means of an impression device, in particular by an embossing process.

A further alternative possibility would be to provide a separate further layer 9 for forming the structures 4. The further layer 9 may be applied directly to the carrier layer 8. The further layer 9 is indicated by a dashed line. Hence, e.g., the further layer 9 may be formed by an embossing lacquer which is deformed according to the formation of the structures 4. This can, in turn, be performed by means of the impression device or an impression element in an embossing process. Thus, in turn, the structures 4 can be formed. The further layer 9 with the structures 4 formed therein may have a layer thickness with a layer thickness value from a layer thickness value range the lower limit of which is 0.5 μm, in particular 0.8 μm, preferably 1 μm, and the upper limit of which is 300 μm, in particular 50 am, preferably 20 am.

Figure 2:
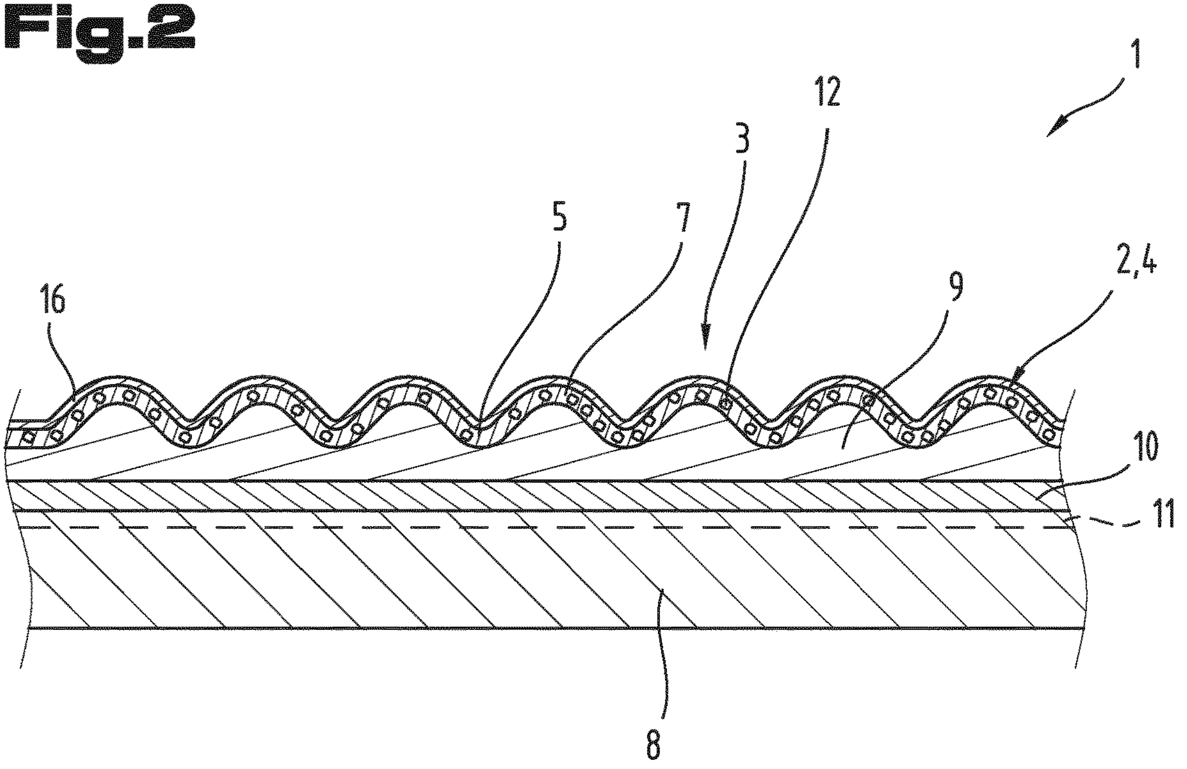
FIG. 2 a section through another exemplary embodiment of the security element.

FIG. 2 additionally shows that the structures 4 are formed by the further layer 9, however, the further layer 9 is not applied directly to the carrier layer 8. For this purpose, an intermediate layer 10 can be provided, which is formed, for example, by an adhesion promoter, a primer, an adhesive or the like.

In addition to the intermediate layer 10, a reflective layer 11 may, for example, also be provided. The reflecting layer 11 is indicated by a dashed line. If the reflective layer 11 is provided, the intermediate layer 10 preferably formed of an adhesion promoter or primer could be provided on both sides thereof. However, it would also be possible to provide only the reflective layer 11, which can be formed over the entire surface or partially, instead of the intermediate layer 10, or to form the intermediate layer 10 as a reflective layer or layer over the entire surface or partially.

The optical effect layer 7 may, for example, contain color-shifting pigments 12. FIG. 1 shows one of the color-shifting pigments 12 laterally in a greatly enlarged representation. Thus, the color-shifting pigments 12 may each comprise at least one absorber layer 13, at least one spacer layer 14 of a dielectric material and at least one reflection layer 15. In the present exemplary embodiment, the individual layers of the color-shifting pigment 12 are arranged on top of one another in layers. In this case, the spacer layer 14 are arranged between the reflection layer 15 and the absorber layer 13.

However, it would also be possible to select a physical arrangement of the layers with respect to one another in which the reflection layer 15 is arranged on the inside and is surrounded, in particular entirely enclosed, by the spacer layer 14. The spacer layer 14 can, in turn, be surrounded by the absorber layer 13, in particular be entirely enclosed by it.

Hence, it is achieved that when the light source 6 is moved and/or the viewing angle is changed, a color-shifting effect occurs in the optical effect layer 7 due to the color-shifting pigments 12.

The at least one absorber layer 13 may comprise at least one metallic material, in particular selected from the group of nickel, titanium, vanadium, chromium, cobalt, palladium, iron, tungsten, molybdenum, niobium, aluminum, silver, copper and/or alloys of these materials or be made of at least one of these materials.

The at least one spacer layer 14 may comprise at least one low refractive index dielectric material having a refractive index of less than or equal to 1.65, in particular selected from the group of aluminum oxide ($Al_2O_3$), metal fluorides, for example magnesium fluoride ($MgF_2$), aluminum fluoride ($AlF_3$), silicon oxide ($SIO_x$), silicon dioxide ($SiO_2$), cerium fluoride ($CeF_3$), sodium aluminum fluorides (e.g. $Na_3AlF_6$ or $Na_5Al_3F_{14}$), neodymium fluoride ($NdF_3$), lanthanum fluoride ($LaF_3$), samarium fluoride ($SmF_3$) barium fluoride ($BaF_2$), calcium fluoride ($CaF_2$), lithium fluoride (LiF), low refractive index organic monomers and/or low refractive index organic polymers, or at least one high refractive index dielectric material having a refractive index of greater than 1.65, in particular selected from the group of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron (II,III) oxide ($Fe_3O_4$) and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers and/or high refractive index organic polymers, or be made of at least one of these materials.

The at least one reflection layer 15 may comprise at least one metallic material, in particular selected from the group of silver, copper, aluminum, gold, platinum, niobium, tin, or of nickel, titanium, vanadium, chromium, cobalt and palladium, or alloys of these materials, in particular cobalt-nickel alloys, or at least one high refractive index dielectric material having a refractive index of larger than 1.65, in particular selected from the group of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron (II,III) oxide ($Fe_3O_4$) and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers and/or high refractive index organic polymers, or be made of at least one of these materials.

Furthermore or additionally, it would also be possible that the optical effect layer 7 contains metallic pigments and/or magnetic pigments and/or color pigments and/or colorants.

The metallic pigments in the optical effect layer 7 may be selected from the group of Al and/or Cu and/or Ag and/or Au and/or Ni and/or Cr and/or Pt and/or Pd and/or $TiO_2$ and/or Cr oxides and/or ZnS and/or ITO and/or Bi oxide and/or ATO and/or FTO and/or ZnO and/or $Al_2O_3$ and/or Zn chromate and/or Fe oxides and/or CuO. To form a printed image as the optical effect layer 7 or a layer thereof, the metallic pigments may, for example, be admixed to an ink.

The metallic pigments, in particular Al and/or Cu and/or Ag and/or Au and/or Ni and/or Cr and/or Pt and/or Pd and/or $TiO_2$ and/or Cr oxides and/or ZnS and/or ITO and/or Bi oxide and/or ATO and/or FTO and/or ZnO and/or $Al_2O_3$ and/or Zn chromate and/or Fe oxides and/or CuO and/or color-shifting interference pigments and/or $SiO_2$ pigments, may also be added to a lacquer, which together form the optical effect layer 7 or a layer thereof.

In addition to the optical effect layer 7, further layers or plies can be provided, for example an optically non-linear layer or an optically non-linear ply. Such a layer or such materials or plies forming this layer are also referred to as IR upconverters or UV downconverters. In this regard, these may be materials which, under the influence of electromagnetic radiation outside the visible wavelength range of light, have a visible color. Such materials can be excited to emit visible light under these conditions, for example, when exposed to infrared (IR) ($\lambda$>780 nm) and/or ultraviolet (UV) light ($\lambda$<380). The further layers may, furthermore, contain fluorescent pigments and/or fluorescent substances.

The arrangement or application of the optical effect layer 7 or its layers onto the structures 4 can, for example, be carried out by a printing process and/or an evaporation process or multiple ones thereof. However, the materials or additives of the reflection layer 15 described above may also form a part or a layer of the optical effect layer 7. These may, in particular, be printed or vapor-deposited and thus form a separate layer of the optical effect layer 7.

If, for example, a printed image is provided as the optical effect layer 7 for the security element 1, e.g. a partial opaque printing color, such as white, and/or a semitransparent metallization may be used. In this regard, inter alia, a matte and/or a glossy degree of gloss may be formed.

As the uppermost layer on the optical effect layer 7, e.g., a protective layer 16 may be provided which protects the entire layer and/or ply structure from mechanical damage such as scratches, grooves or the like. The protective layer 16 could also be arranged on the side of the carrier layer 8 facing away from the optical effect layer 7. An arrangement on both sides would also be conceivable. Preferably, by means of the protective layer 16, a planar formation of the security element 1 may be achieved, as is indicated by a dashed line in FIG. 1.

Below, FIGS. 3 to 8 show possible layer structures of the security element 1, mostly starting from the structures 4, each in simplified representations. The application of these layers or plies onto the carrier layer 8 described above preferably is to be provided. In this regard, it should be noted that the materials and/or additives described above for the individual layers may be applied and/or used for the formation of the optical effect layer 7 in these exemplary embodiments.

It should be noted that depending on the formation of the individual layers and/or plies, the viewing direction of an observer may be directed merely onto one side of the security element 1 or onto the security element 1 from both sides. Since the layer generally referred to as optical effect layer 7 may also comprise multiple layers and/or plies, it is possible to provide the optical effect layer 7 merely on one of the surfaces of the structures 4 or the layer or ply forming these. However, it would also be possible to provide the optical effect layer 7 and/or additional layers or plies on both sides or surfaces of the structures 4 or the layer or ply forming these. Thus, it becomes possible, for example, to arrange individual layers or plies of the optical effect layer 7 on the one side of the structures 4 and further possible layers or plies of the optical effect layer 7 on the opposite side of the structures 4. Hence, a splitting of the optical effect layer 7 may be achieved. However, it would also be possible to arrange the optical effect layer 7 merely on one of the sides and/or one of the surfaces of the structures 4 and to arrange at least one of the additional layers and/or plies on the opposite side of the structures 4. Hence, a high possibility of variation can be created.

Figure 3:
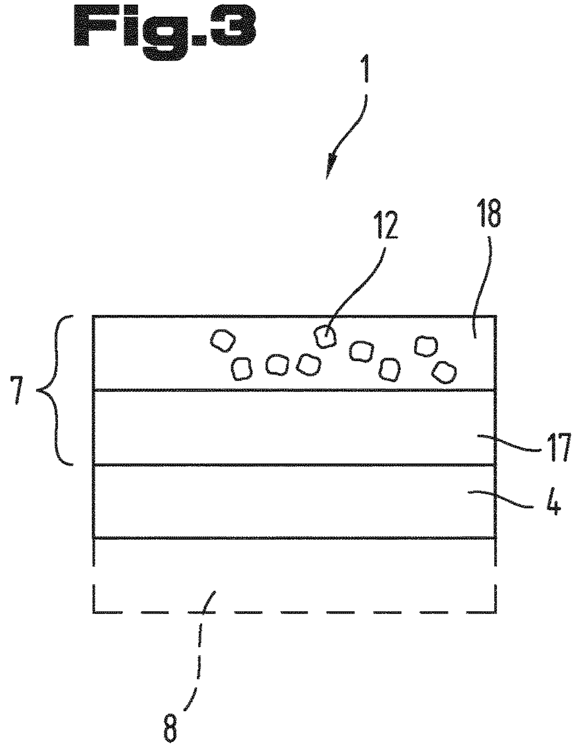
FIG. 3 a first possible layer and/or ply structure of the security element in a view and stylized representation.

FIG. 3 shows a possible layer and/or ply structure of the security element 1 comprising the structures 4 and the optical effect layer 7. The carrier layer 8 is also adumbrated. The optical effect layer 7 comprises a layer 17 which has or forms a high refractive index (HRI). In this regard, the layer 17 is arranged closer to or directly adjacent to the structures 4. At this point, it should be explicitly noted that the layer 17, irrespectively of its formation, may be merely an optional embodiment and advancement.

Irrespectively thereof, however, the layer 17 may also be formed by a semitransparent metallization layer. Furthermore, the optical effect layer 7 comprises a further layer 18 which is formed of a printing color containing the color-shifting pigments 12. The further layer 18 is arranged on that side of layer 17 with the high refractive index which faces away from the structures 4.

It is provided in the exemplary embodiments according to FIGS. 3 to 6 that the optical effect layer 7, in particular the layers and/or plies forming it, is arranged merely on one side of the layer or ply forming or carrying the structures 4. In this regard, a unilateral arrangement of the optical effect layer 7 is made reference to. This preferably is the side or surface of the structures 4 which also has or forms the spatial structuring. In most cases, this is also the side facing the observer. This can be the case, however, the optical effect layer 7 can also be arranged on the side facing away from the observer.

Figure 4:
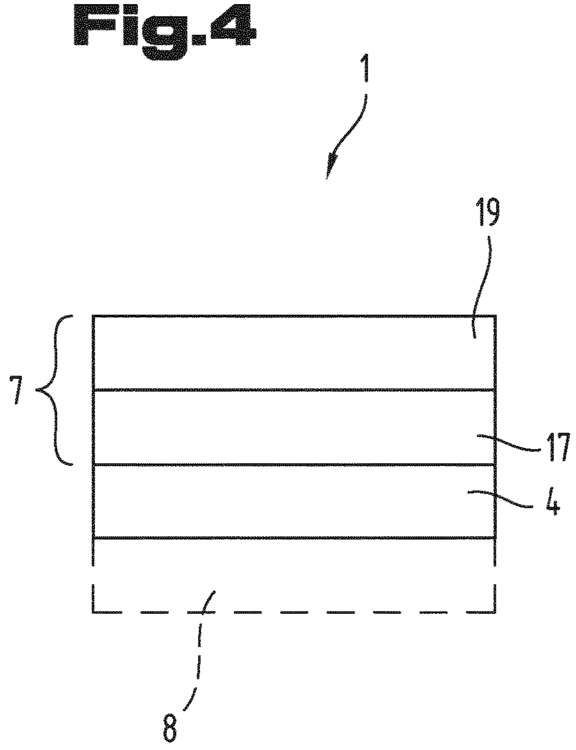
FIG. 4 a second possible layer and/or ply structure of the security element in a view and stylized representation.

FIG. 4 shows a further possible layer and/or ply structure of the security element 1 comprising the structures 4 and the optical effect layer 7. The carrier layer 8 is also adumbrated. Here, in turn, the optical effect layer 7 comprises the layer 17 described above in FIG. 3 which has or forms a high refractive index (HRI). In this regard, the layer 17 is arranged closer to or directly adjacent to the structures 4.

Irrespectively thereof, however, the layer 17 may also be formed by a semitransparent metallization ply. A further thin layer 19 is formed of metallic pigments. As a possible variant of the further layer 19 of metallic pigments, it should be noted that this layer can also be colored by a colorant or color pigments. The further layer 19 is arranged on that side of layer 17 with the high refractive index which faces away from the structures 4.

Figure 5:
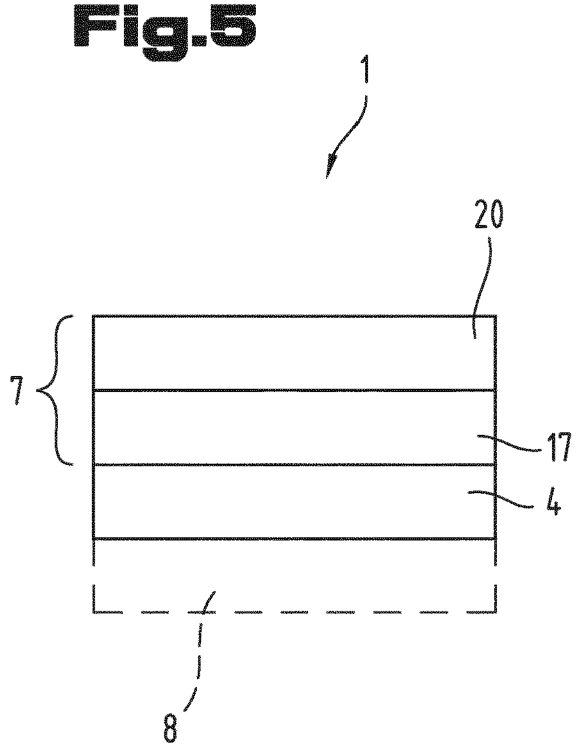
FIG. 5 a third possible layer and/or ply structure of the security element in a view and stylized representation.

FIG. 5 shows a possible further layer and/or ply structure of the security element 1 comprising the structures 4 and the optical effect layer 7. The carrier layer 8 is also adumbrated. Here, again, the optical effect layer 7 comprises the layer 17 described above in FIGS. 3 and 4 which has or forms a high refractive index (HRI). In this regard, the layer 17 is arranged closer to or directly adjacent to the structures 4.

Furthermore, the optical effect layer 7 comprises a further layer 20 which is formed by a color layer in this exemplary embodiment. The color layer forming the further layer 20 may, for example, be applied in a printing process. The further layer 20 is arranged on that side of layer 17 with the high refractive index which faces away from the structures 4.

Figure 6:
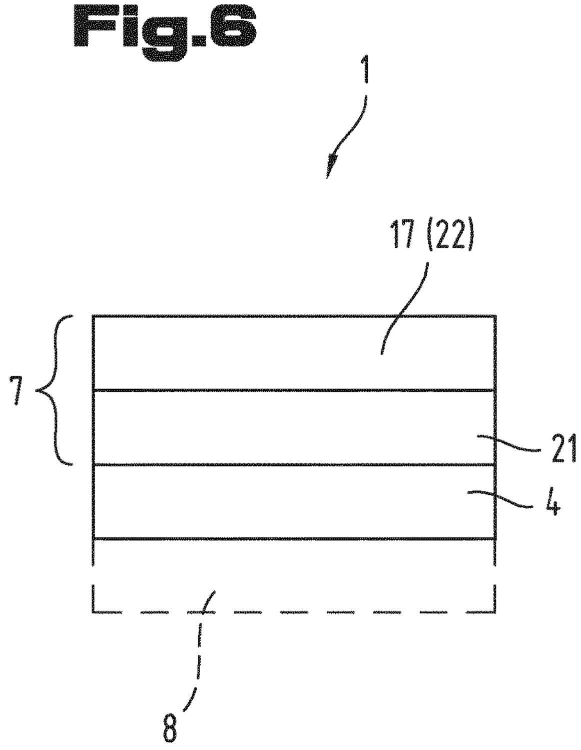
FIG. 6 a fourth possible layer and/or ply structure of the security element in a view and stylized representation.

FIG. 6 shows a possible further layer and/or ply structure of the security element 1 comprising the structures 4 and the optical effect layer 7. The carrier layer 8 is also adumbrated. The optical effect layer 7, in turn, comprises a layer 21 which is immediately adjacent to the structures 4 and which is formed by a partially arranged or partially applied opaque color layer. The color layer forming the further layer 21 may, for example, be applied in a printing process.

The layer 17 described above, which has or forms the high refractive index (HRI) is provided as the further layer. In this exemplary embodiment, the layer 17 is preferably formed over the entire surface or provided over the entire surface. However, it would also be possible to provide a layer 22, which is formed of a semitransparent metallization, instead of the layer 17 with the high refractive index. Thus, reference number 22 is shown in parentheses next to reference number 17. At this point, it should be noted that, in the present context, generally any layer of a material with a high refractive index (HRI) can be replaced by a semitransparent metallization.

In all the described exemplary embodiment, for example, each one of the structures 4 can be formed of a reflective material or substance itself. However, it would also be possible to provide a separate layer of a reflecting material or substance, as is described in particular in FIG. 2 with the reflective layer 11.

Figure 7:
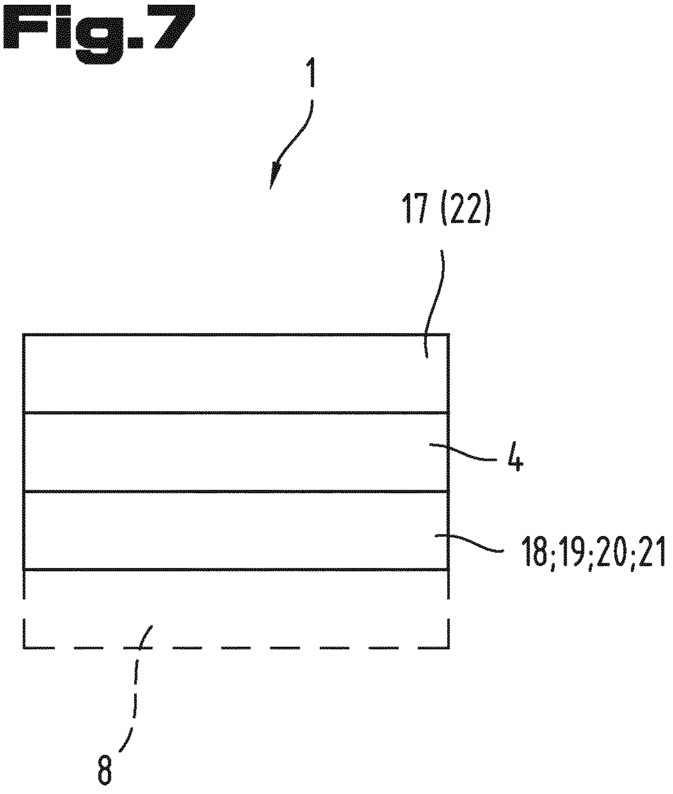
FIG. 7 a fifth possible layer and/or ply structure of the security element in a view and stylized representation.
Figure 8:
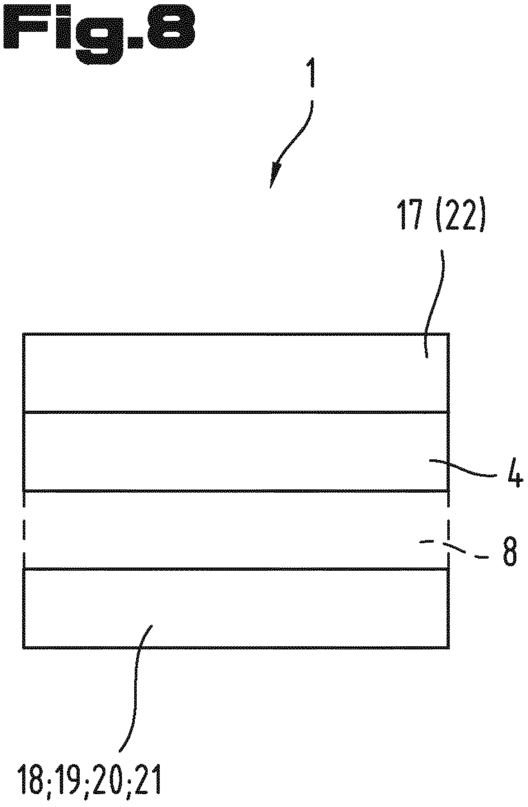
FIG. 8 a sixth possible layer and/or ply structure of the security element in a view and stylized representation.

FIGS. 7 and 8 each show the previously indicated possibility of arrangement of the layers and plies on both sides of the layer or ply carrying or forming the structures 4. Here, as well, the structures 4 can be covered by the optical effect layer 7 over their entire surface or partially. The layers or plies forming the optical effect layer 7 and/or the further possible layers or plies may also be arranged on opposite sides and/or surfaces such, with respect to one another, that they entirely overlap and/or overlap merely in some sections. However, irrespectively thereof, it would also be possible to select the arrangement of both sides such that the structures 4 are entirely covered, however, the layers or plies located on both sides not or just slightly overlap another.

It is provided in the exemplary embodiment shown in FIG. 7 that further ones of the layers or plies described above are arranged on both sides of the layer or ply with the structures 4. In most cases, the layer or ply with the structures 4 is predominantly planar on one side and provided with the structures 4 on the opposite side. The structures 4 are preferably arranged or formed on each side facing away from the carrier layer 8 if it is provided.

Here, as described in FIGS. 3 to 5, the layer 17, which has or forms the high refractive index (HRI), is arranged on one side of the structures 4. It would also be possible to provide the layer 22, which is formed of a semitransparent metallization, instead of the layer 17.

Here, at least one of the further possible layers 18 and/or 19 and/or 20 and/or 21 is provided on the opposite side of the layer or ply with the structures 4. This entire layer structure can, in turn, be arranged on the carrier layer 8, as is indicated in dashed lines.

In the exemplary embodiment shown in FIG. 8, analogously to the exemplary embodiment in FIG. 7, the layer 17, which has or forms the high refractive index (HRI), as also described in FIGS. 3 to 5, is also arranged on one side of the structures 4. It would also be possible to provide the layer 22, which is formed of a semitransparent metallization, instead of the layer 17.

The carrier layer 8, if present, is provided on the opposite side of the layer or ply with the structures 4. This applies if the structures 4 are not formed directly therein. On the other side of the carrier layer 8 facing away from the layer or ply with the structures 4, at least one of the further layers 18 and/or 19 and/or 20 and/or 21 can be provided.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The invention claimed is:

1. A security element for papers of value, security paper or security objects, comprising:

at least one first region with structures that reflect an image motif in different spatial regions, such that a moving image is produced for an observer when a light source is moved correspondingly and/or when a viewing angle is changed, wherein, when the light source is moved and/or the viewing angle is changed, a movement of the image motif occurs at the same time; and an optical effect layer, said optical effect layer defining a second region and covering the structures over their entire surface or partially, wherein the optical effect layer contains color-shifting pigments including at least one absorber layer, at least one spacer layer made of a dielectric material, and at least one reflection layer, wherein the spacer layer is arranged between the reflection layer and the absorber layer.

2. The security element according to claim 1, wherein the optical effect layer comprises at least one cholesteric liquid crystal layer.

3. The security element according to claim 1, wherein the optical effect layer comprises at least one layer on a side facing away from the observer which enhances a color-shifting effect of the color-shifting pigments.

4. The security element according to claim 1, wherein, when the light source is moved and/or when the viewing angle is changed, a color-shifting effect occurs in the optical effect layer.

5. The security element according to claim 1, wherein the optical effect layer contains metallic pigments and/or magnetic pigments and/or color pigments and/or colorants.

6. The security element according to claim 1, wherein, in addition to the optical effect layer, an optically non-linear layer or an optically non-linear ply and/or a layer which contains fluorescent pigments and/or fluorescent substances is present.

7. The security element according to claim 1, wherein the optical effect layer is printed and/or vapor-deposited on the structures.

8. The security element according to claim 1, wherein the at least one absorber layer comprises at least one metallic material selected from the group of nickel, titanium, vanadium, chromium, cobalt, palladium, iron, tungsten, molybdenum, niobium, aluminum, silver, copper and/or alloys of these materials.

9. The security element according to claim 1, wherein the at least one spacer layer comprises:

at least one low refractive index dielectric material having a refractive index of less than or equal to 1.65 and selected from the group of aluminum oxide ($Al_2O_3$), metal fluorides, magnesium fluoride ($MgF_2$), aluminum fluoride ($AlF_3$), cerium fluoride ($CeF_3$), sodium aluminum fluorides (e.g. $Na_3AlF_6$ or $Na_3Al_3F_{14}$), silicon oxide ($SlO_x$), silicon dioxide ($SiO_2$), neodymium fluoride ($NdF_3$), lanthanum fluoride ($LaF_3$), samarium fluoride ($SmF_3$) barium fluoride ($BaF_2$), calcium fluoride ($CaF_2$), lithium fluoride (LiF), low refractive index organic monomers and/or low refractive index organic polymers, and/or at least one high refractive index dielectric material having a refractive index of greater than 1.65, and selected from the group of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxide ($Fe_3O_4$ and/or $Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers, and/or high refractive index organic polymers.

10. The security element according to claim 1, wherein the at least one reflection layer comprises;

at least one metallic material selected from the group of silver, copper, gold, platinum, aluminum, niobium, tin, or of nickel, titanium, vanadium, chromium, cobalt and palladium, or alloys of these materials, and/or at least one high refractive index dielectric material having a refractive index of larger than 1.65 and selected from the group of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxide ($Fe_3O_4$ and/or $Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high refractive index organic monomers, and/or high refractive index organic polymers.

11. The security element according to claim 1, wherein the security element is equipped with machine-readable features, wherein the machine-readable features are magnetic coding, electrically conductive layers, materials absorbing and/or remitting electromagnetic waves.

12. The security element according to claim 1, wherein the security element has additional layers, said additional layers comprising protective lacquers, heat-sealing lacquers, adhesives, primers and/or films.

13. The security element of claim 1, wherein the papers of value, security paper or security objects comprise banknotes, identification cards, credit cards, debit cards, or tickets.

14. A security element for papers of value, security paper or security objects, comprising:

at least one first region with structures that reflect an image motif in different spatial regions, such that a moving image is produced for an observer when a light source is moved correspondingly and/or when a viewing angle is changed, wherein, when the light source is moved and/or the viewing angle is changed, a movement of the image motif occurs at the same time;

an optical effect layer, said optical effect layer defining a second region and covering the structures over their entire surface or partially; and a carrier layer of a translucent plastic material and/or a thermoplastic material, wherein the carrier layer comprises at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylcholride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP), and/or mixtures and/or copolymers of these materials.

15. The security element according to claim 14, wherein the carrier layer has a thickness in the range of 5 µm to 1000 µm.

16. The security element according to claim 14, wherein the structures are inserted into the carrier layer by means of an embossing process.

17. The security element according to claim 14, wherein the structures are formed in a further layer comprising an embossing lacquer layer applied over the carrier layer, the embossing lacquer layer impressed by means of an impression device.

18. The security element according to claim 17, wherein the further layer with the structures formed therein has a layer thickness in the range of 0.5 µm to 300 µm.

19. The security element of claim 14, wherein the papers of value, security paper or security objects comprise banknotes, identification cards, credit cards, debit cards, or tickets.

20. A security element for papers of value, security paper or security objects, comprising:

at least one first region with structures that reflect an image motif in different spatial regions, such that a moving image is produced for an observer when a light source is moved correspondingly and/or when a viewing angle is changed, wherein, when the light source is moved and/or the viewing angle is changed, a movement of the image motif occurs at the same time; and an optical effect layer, said optical effect layer defining a second region and covering the structures over their entire surface or partially, wherein the structures are formed as diffractive structures, as micromirrors, as facets with a radiation-optical effect, or as achromatic, reflective structures.

* * * * *